(12) United States Patent
Chae et al.

(10) Patent No.: US 9,471,151 B2
(45) Date of Patent: Oct. 18, 2016

(54) DISPLAY AND METHOD CAPABLE OF MOVING IMAGE

(71) Applicant: Hyundai Motor Company, Seoul (KR)

(72) Inventors: Suhong Chae, Hwaseong-si (KR); Daeyun An, Seoul (KR); Gi Beom Hong, Bucheon-si (KR); Jongmin Oh, Ulsan (KR); Jungsang Min, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 234 days.

(21) Appl. No.: 14/051,376

(22) Filed: Oct. 10, 2013

(65) Prior Publication Data

US 2014/0145933 A1    May 29, 2014

(30) Foreign Application Priority Data

Nov. 27, 2012    (KR) .................... 10-2012-0135516

(51) Int. Cl.
| | |
|---|---|
| G09G 5/00 | (2006.01) |
| G06F 3/01 | (2006.01) |
| G02B 27/01 | (2006.01) |
| B60K 35/00 | (2006.01) |
| B60K 37/06 | (2006.01) |

(52) U.S. Cl.
CPC .............. *G06F 3/017* (2013.01); *B60K 35/00* (2013.01); *B60K 37/06* (2013.01); *G02B 27/01* (2013.01); *B60K 2350/1052* (2013.01); *G02B 2027/014* (2013.01); *G02B 2027/0187* (2013.01)

(58) Field of Classification Search
CPC .......... B60K 2350/1052; B60K 35/00; B60K 37/06; G02B 2027/014; G02B 2027/0187; G02B 27/01; G06F 3/017
See application file for complete search history.

(56) References Cited

U.S. PATENT DOCUMENTS

| | | | |
|---|---|---|---|
| 2002/0057383 A1* | 5/2002 | Iwamura | ...................... 348/734 |
| 2010/0053151 A1* | 3/2010 | Marti | ..................... G06F 3/011 345/419 |
| 2011/0310453 A1* | 12/2011 | Mizoguchi et al. | ....... 359/200.7 |

FOREIGN PATENT DOCUMENTS

| | | |
|---|---|---|
| JP | 2003-175744 A | 6/2003 |
| JP | 2011-006034 A | 1/2011 |
| KR | 10-0787121 B1 | 12/2007 |

\* cited by examiner

*Primary Examiner* — Kumar Patel
*Assistant Examiner* — Insa Sadio
(74) *Attorney, Agent, or Firm* — McDermott Will & Emery LLP (57) ABSTRACT

A display capable of moving an image determines whether an input signal is coordinate information according to a gesture of a hand or an external input signal. The display calculates, if the input signal is coordinate information, the coordinate that is moved according to the gesture of the hand. After determining whether the hand gesture is a lateral movement, the display generates, if the hand gesture is a lateral movement, a control signal to move a second image mover to the left or right side. A rotator that is included in the display moves the second image mover according to the control signal and displays the image at a moved position through the moved second image mover.

7 Claims, 6 Drawing Sheets

DISPLAY AND METHOD CAPABLE OF MOVING IMAGE

CROSS-REFERENCE TO RELATED APPLICATION

This application claims the benefit of priority to Korean Patent Application No. 10-2012-0135516 filed in the Korean Intellectual Property Office on Nov. 27, 2012, the entire contents of which are incorporated herein by reference.

TECHNICAL FIELD

The present disclosure relates to a display and method capable of moving an image, and more particularly, to a display and method to move an image for a driver's sight providing driving information such as speed, night vision, rear camera image, etc., on front window to secure driver's safety.

BACKGROUND

For safe driving, it is important for a driver easily to recognize driving information and other information of the vehicle. However, in order to follow up driving information and other information of the vehicle, the driver needs to pay attention to a dashboard frequently which may cause a dangerous situation.

A vehicle head up display (HUD) has been developed to solve the above problem. By enlarging and projecting driving information such as speed or fuel status of the vehicle and image information such as night or rear vision on a front glass window instead of on a dashboard, a driver can easily recognize the information while focusing on front view, thus securing the driver's safety. The driver can recognize information on front glass of the vehicle in a combiner maximizing the safety by fixing the drivers view to the front.

In conventional HUD technology, position of an image projected on the HUD is fixed to driver's sight, thus directly controlling the screen may not be possible for a passenger. Therefore, drivers driving may be deteriorated when trying to manipulate the image.

The above information disclosed in this Background section is only for enhancement of understanding of the background of the disclosure, and therefore, may contain information that does not form the prior art already known in this country to a person of ordinary skill in the art.

SUMMARY

The present disclosure provides a display and a method capable of moving an image, freely setting an image position, and easily manipulating the image.

A display according to an exemplary embodiment of the present disclosure includes a hand position detector detecting a moving direction and position of a hand based on previously stored coordinate information. A first image mover is rotated by a present angle and outputs an input image, and a second image mover is rotated and outputs the image from the first image mover. A rotator is connected to the first image mover and the second image mover and laterally moves the second image mover based on an input control signal, or rotates the first image mover by a preset angle and laterally rotates the second image mover by a preset angle. A controller generates a control signal and transfers the control signal to the rotator to laterally move the second image mover based on a moving direction and position of the hand detected by the hand position detector. A display screen simultaneously displays at least one image output from the second image mover.

The display may further include an image provider that outputs an image to the first image mover.

The controller may generate a control signal to enlarge or reduce size of the image on which the display screen displays based on a moving direction of the hand detected by the hand position detector.

The controller may generate a control signal that controls the rotator to rotate the first image mover by a preset angle and laterally rotate the second image mover by a preset angle based on an input signal from a driver. The second image mover may sequentially provide at least one image to the display screen.

The first and the second image movers may be embodied as a mirror, and the rotator may be embodied as a motor.

The display screen may be embodied as a plurality of output frames that can simultaneously display at least one image.

According to another exemplary embodiment of the present disclosure, a method to display an image on a display includes: determining whether an input signal is coordinate information according to a gesture of a hand or an external input signal; calculating coordinate that is moved according to the gesture of the hand if the input signal is coordinate information; and determining whether the hand gesture is lateral movement. The method to display an image on a display further includes: generating, if the hand gesture is lateral movement, a control signal to move the second image mover that is included in the display to the left or the right side; moving the second image mover according to the control signal by a rotator that is included in the display; and displaying the image at a moved position through the moved second image mover.

The method may further include, after the determining whether the hand gesture is lateral movement, enlarging or reducing and displaying an image that is provided through the display by the calculated coordinate if the hand gesture is vertical movement.

The determining whether the input signal is coordinate information according to the gesture of the hand or the external input signal may include rotating the first image mover that is included in the display by a preset angle if the input signal is the external input signal; repeating the lateral rotation of the second image mover by a preset angle; and sequentially providing at least one image through the second image mover, displaying the first image when the second image mover is rotated to the left side, and displaying the second image when the second image mover is rotated to the right side.

According to the present disclosure, since the entire area of center fascia can be employed for a display, positions of the HUD, audio, video, and navigation (AVN) system can be freely moved, enlarged, or reduced.

The image can be provided through an intuitional interaction design according to a user's intention instead of a predetermined position. Further, free design shape can provide a greater satisfaction to a user.

DETAILED DESCRIPTION

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Hereinafter, a display and a method capable of moving an image will be described in detail with reference to the drawings. A display 100 is positioned in the center fascia, but is not limited thereto.

Figure 1A:
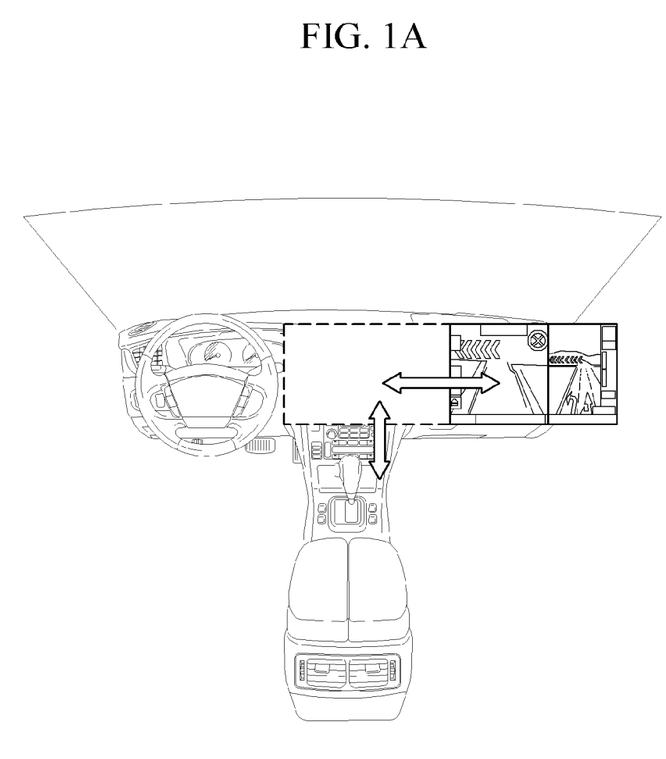
FIGS. 1A and 1B are schematic diagrams illustrating a display that can move an image according to an exemplary embodiment of the present disclosure.
Figure 1B:
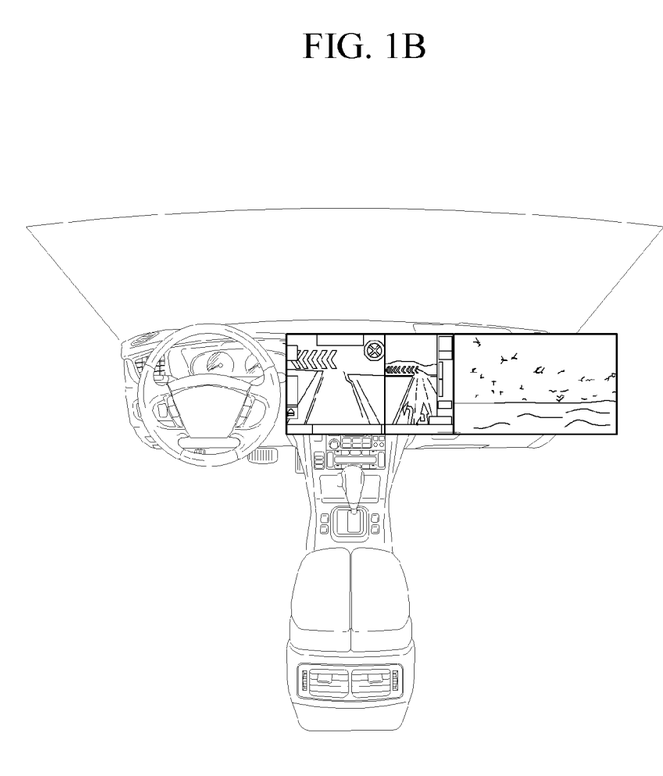

FIG. 1 is a schematic diagram illustrating a display capable of moving an image for a driver.

As shown in FIGS. 1A and 1B, an image is displayed on the center fascia or head up display (HDU) in a vehicle, allowing a driver or a passenger to view the image. Referring to FIG. 1A, the image may be displayed in a desired direction according to the driver or the passenger, and referring to FIG. 1B, two different images may be simultaneously displayed.

A screen may move from the driver side to the passenger side by manipulating a gesture taken by the driver or the passenger, touch screen, or an input switch. The passenger may perform an additional input through touch screen or a gesture toward the passenger side and may move the screen adjacent to the driver seat.

There may be a portion on which no image is displayed in a case in which the screen is stationary or moves toward the driver seat. Here, other images may be projected or another existing image may be enlarged and displayed since the display screen is embodied with a plurality of output frames to project at least one image.

The display 100 having above functions is disposed in the center fascia with an image displayed, but the present disclosure is not limited thereto. When an image is displayed on a specific area, as the driver or the passenger takes a gesture, the image is moved, enlarged, or reduced. The image may also be moved, enlarged, or reduced by touching or inputting a menu that is included in a displayed image.

Figure 2:
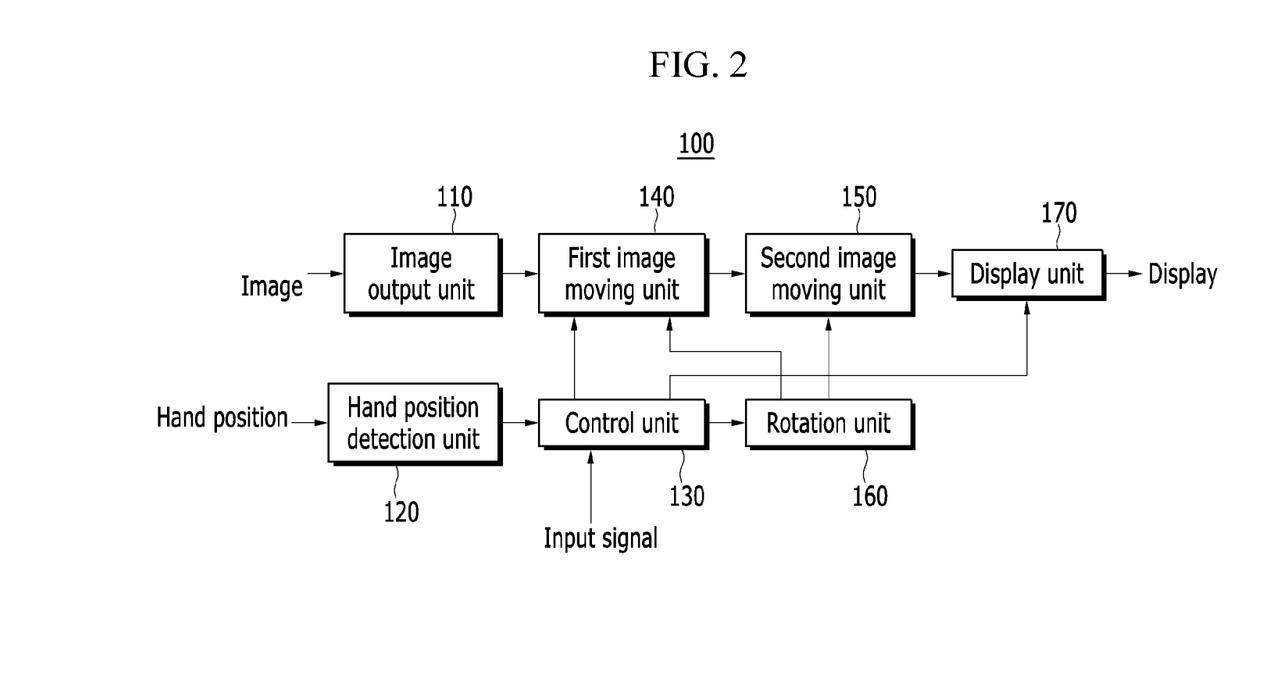
FIG. 2 is a block diagram illustrating a display configuration according to an exemplary embodiment of the present disclosure.

FIG. 2 is a block diagram illustrating a display configuration according to an exemplary embodiment of the present disclosure.

As shown in FIG. 2, the display 100 includes an image provider 110, a hand position detector 120, a controller 130, a first image mover 140, a second image mover 150, a rotator 160, and a display screen 170.

The image provider 110 outputs an image from outside or an image shown in a specific area such as a navigation search screen. In this case, the image is output to the first image mover 140.

When the display screen 170 provides an image on the specific area, the hand position detector 120 determines a gesture of the driver or the passenger, which is disposed in front of the display screen 170. The hand position detector 120 determines whether the position of a hand laterally or vertically moves according to the gesture of the driver or the passenger based on previously stored coordinate information and detects a position of the hand. The coordinate information is coordinate information of the entire area of center fascia. A method of determining whether a position of a hand is moved based on coordinate information is already known, therefore, a detailed description thereof will be omitted.

The controller 130 generates a control signal that controls the second image mover 150 to move in an x-axis direction or to rotate by a preset angle based on the hand position detector 120 and transfers the control signal to the rotator 160. Further, the controller 130 controls the display screen 170 to enlarge or reduce size of the image that is displayed on the display screen 170 based on position of the hand.

For example, when the driver or the passenger moves the hand to left or right based on the display screen 170, the controller 130 controls the rotator 160 to move the second image mover 150 to the left or the right side, thereby moving and displaying the image on the display screen 170 at a moved point. When the driver or the passenger moves the hand upward or downward, the controller 130 generates a control signal to enlarge or reduce the image that is formed on the display screen 170.

When the driver or the passenger inputs an input signal to simultaneously provide two images through an input menu on the screen, the controller 130 transmits the control signal to the rotator 160. Then, the first image mover 140 may be rotated by a preset angle and the second image mover 150 may be laterally rotated by a preset angle.

Further, the controller 130 performs input and output check of the image and curved surface correction, thus displaying the image without distortion, with a display having any shape. A method to control an input and output check of an image and curved surface correction has been already known, a detailed description thereof will be omitted.

The first image mover 140 reflects and moves the image output from the image provider 110 toward the second image mover 150. The first image mover 140 is embodied as a mirror, but the present disclosure is not limited thereto.

The second image mover 150 reflects and moves the image reflected from the first image mover 140 to the display screen 170. The second image mover 150 is embodied as a mirror, but the present disclosure is not limited thereto. The second image mover 150 may be laterally moved in an x-axis direction or rotated by a preset angle interlocking with the rotator 160.

The rotator 160 laterally moves the second image mover 150 in an x-axis direction or rotates the first image mover 140 by a preset angle. The rotator 160 further laterally rotates the second image mover 150 by a preset angle by the controller 130, thereby simultaneously displaying two images on the display screen 170. For this purpose, the rotator 160 is embodied as a motor, but the present disclosure is not limited thereto.

The display screen 170 is an intermediary that forms and displays an image so that the driver or the passenger may recognize the image reflected from the second image mover 150. The display screen 170 displays the image in the entire area of center fascia.

The display screen 170 is formed of transparent plastic and a film. However, when the display screen 170 is an HUD, the display screen 170 may be embodied in a form of a front glass window. The display screen 170 has a length corresponding to the entire area of center fascia. Further, as two or more output frames are provided, different images may be simultaneously displayed.

A method of displaying an image through the display will be described with reference to FIG. 3.

Figure 3:
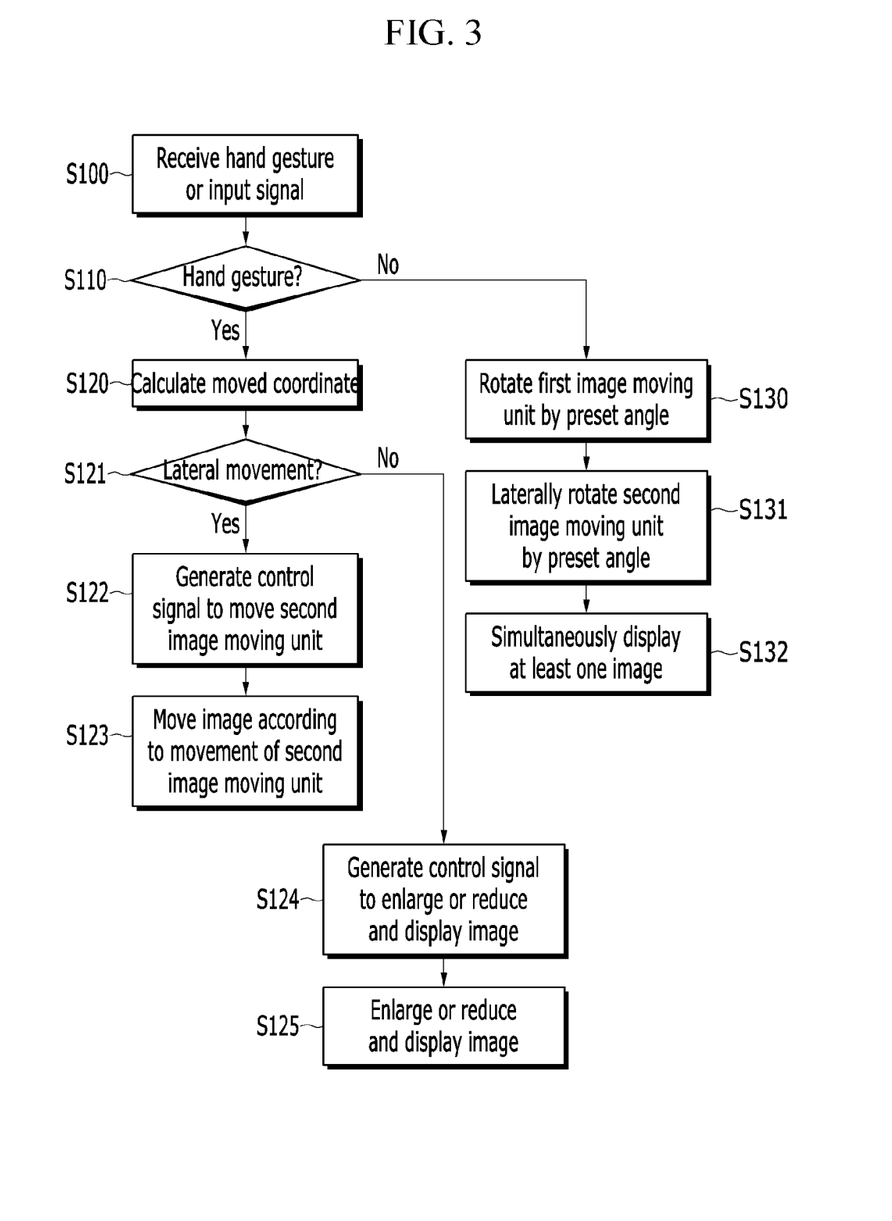
FIG. 3 is a flowchart illustrating a method of displaying an image according to an exemplary embodiment of the present disclosure.

FIG. 3 is a flowchart illustrating a method of displaying an image according to an exemplary embodiment of the present disclosure.

As shown in FIG. 3, the controller 130 receives an input signal from the hand position detector 120 or outside (S100). The controller 130 determines whether the received signal is a gesture of a hand in which the hand position detector 120 detects (S110).

When coordinate information is input according to the gesture of the hand, the controller 130 calculates the moved coordinate based on the coordinate information (S120) and determines whether the hand gesture is vertical movement or lateral movement of the hand (S121). If the hand gesture is lateral movement of the hand, the controller 130 generates a control signal so that the rotator 160 moves the second image mover 150 to the left side or the right side (S122). An image provided through the display screen 170 is moved to the left or right side according to the movement of the second image mover 150 for the driver or the passenger (S123).

If the hand gesture is vertical movement of the hand at step S121, the controller 130 generates a control signal to enlarge or reduce and display an image provided through the display screen 170 (S124). The generated control signal is transferred to the display screen 170 to enlarge or reduce the image. The image is then displayed to the driver or the passenger (S125).

If the received signal is an input signal instead of coordinate information according to the gesture of the hand at step S110, the controller 130 generates a control signal so that the first image mover 140 may be rotated by a preset angle, and the rotator 160 rotates the first image mover 140 by a preset angle based on the control signal (S130). The controller 130 generates a control signal so that the second image mover 150 may be laterally rotated with high speed by a preset angle. The rotator 160 enables the second image mover 150 to repeat a lateral rotation with high speed based on the control signal (S131).

The second image mover 150 sequentially provides at least one image to the display screen 170. The display screen 170 simultaneously displays at least one image with at least one output frame (S132). That is, when the second image mover 150 is rotated to the left side, the first image is displayed. When the second image mover 150 is rotated to the right side, the second image is displayed, thus, simultaneously displaying two images. In this case, the second image mover 150 is alternately rotated to the right and left and laterally rotated with high speed to display two images without interruption.

Figure 4:
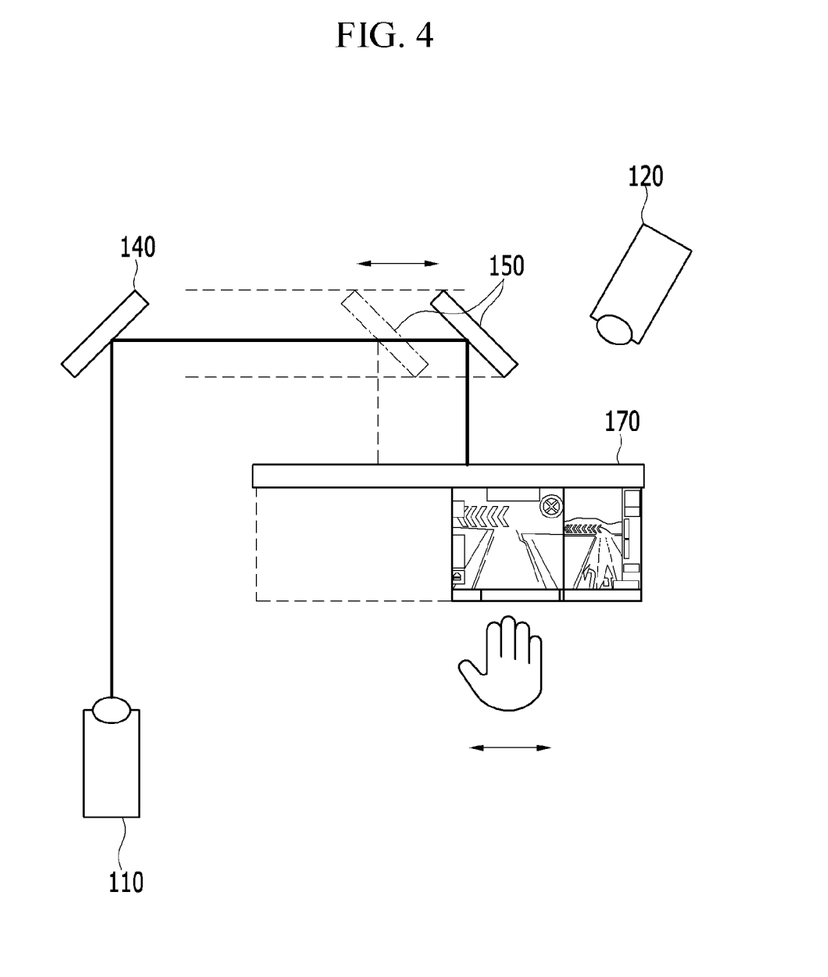
FIG. 4 is a schematic diagram illustrating an image display according to an exemplary embodiment of the present disclosure.

An example of describing an image through the above-described display will be illustrated with reference to FIGS. 4 and 5. FIG. 4 illustrates an example of moving an image, and FIG. 5 illustrates an example of simultaneously displaying two images.

Figure 5:
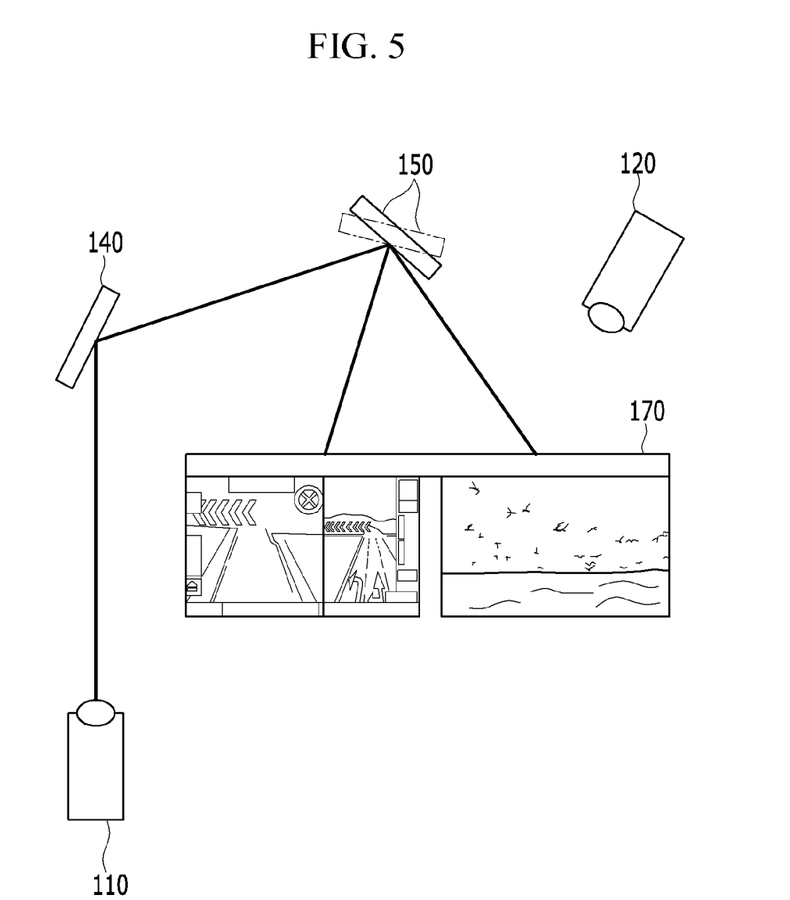
FIG. 5 is a schematic diagram illustrating an image display according to another exemplary embodiment of the present disclosure.

FIG. 4 is a schematic diagram illustrating an image display according to an exemplary embodiment of the present disclosure, and FIG. 5 is a schematic diagram illustrating an image display according to another exemplary embodiment of the present disclosure.

Referring to FIG. 4, when a driver or a passenger moves an image from the driver side to the passenger side through a gesture of a hand, the hand position detector 120 determines a motion of the hand. For this purpose, in the hand position detector 120, coordinate information of a periphery of the display screen 170 is stored. Therefore, by extracting coordinate information, the hand motion is determined.

FIG. 4 illustrates a case in which a hand moves in an x-axis direction from left to right or from right to left. The controller 130 generates a control signal to move a presently displayed image from left to right or from right to left. Therefore, the rotator 160 moves the second image mover 150 from left to right or from right to left based on the control signal. Here, the second image mover 150 receives an image that is reflected from the first image mover 140 to reflect the image to the display screen 170 and to provide the image to the driver or a passenger.

In this case, when the gesture of the hand is vertical motion representing enlargement or reduction of the image, the controller 130 generates a control signal to enlarge or reduce the image. The controller 130 transfers the control signal to the display screen 170 to enlarge or reduce and display the image.

When the gesture of raising a hand from the lower end to the upper end is enlargement of the image, the controller 130 calculates the moved number of the coordinate in which the hand is raised and enlarges the image by the calculated moved number. Alternatively, when a gesture of moving a hand from the upper end to the lower end is reduction of the image, the controller 130 calculates the moved number of a coordinate in which the hand is raised and reduces the image by the calculated moved number.

Therefore, as the moved coordinate number increases, the image may be enlarged or reduced. Several methods of calculating a degree of enlarging or reducing an image according to the moved coordinate number may be used, and an exemplary embodiment of the present disclosure is not limited to one method.

A case of simultaneously displaying at least one image through the display screen 170 having at least one image output frame will be described with reference to FIG. 5.

As shown in FIG. 5, in a state in which one image is displayed, the driver or the passenger may simultaneously display other image through an input menu that is provided in the display screen 170. Thereafter, the controller 130 generates a control signal to simultaneously display two images based on the input signal that is input by the driver or the passenger.

In this case, the control signal is a signal to sequentially transfer two images to the display screen 170 by controlling the rotator 160 to rotate the first image mover 140 by a preset angle and to rotate the second image mover 150 with high speed by a preset angle. Here, a rotation speed of the second image mover 150 is not limited to one speed.

While the present disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A display, comprising:
a hand position detector that detects a moving direction and position of a hand based on previously stored coordinate information;
a first image mover that rotates and outputs an input image to a preset angle;
a second image mover that rotates and outputs an image that is output from the first image mover;
a rotator that is connected to the first image mover and the second image mover, and that linearly moves the second image mover in a lateral direction based on an input control signal or that rotates the first image mover by a preset angle and that laterally rotates the second image mover by a preset angle;
a controller that generates a control signal and transfers the control signal to the rotator to laterally move the second image mover based on a moving direction and position of a hand that is detected by the hand position detector; and
a display screen that displays at least one image which is output from the second image mover,
wherein a displayed position of the at least one image changes in accordance with movement of the second image mover, and
wherein the controller is configured to generate a control signal to sequentially transfer two images to different parts of the display screen by controlling the second image mover to rotate by a preset angle with a speed, thereby the two images being simultaneously displayed on the different parts of the display screen.

2. The display of claim 1, further comprising an image provider that outputs an image to the first image mover.

3. The display of claim 1, wherein the controller generates a control signal to enlarge or reduce a size of the image in which the display screen displays based on a moving direction of the hand in which the hand position detector detects.

4. The display of claim 1, wherein the first image mover and the second image mover are embodied as a mirror and the rotator is embodied as a motor.

5. The display of claim 1, wherein the display screen is embodied as a plurality of output frames that can simultaneously display at least one image.

6. A control method of a display displaying an image, the method comprising:
determining whether an input signal is coordinate information according to a gesture of a hand or an external input signal;
calculating, if the input signal is coordinate information according to the gesture of the hand, a coordinate that is moved according to the gesture of the hand and determining whether the hand gesture is a lateral movement or a vertical movement;
moving, if the hand gesture is the lateral movement, the image that is provided through the display to a left side or a right side in accordance with the hand gesture; and
adjusting, if the hand gesture is a vertical movement, a size of the image by the calculated coordinate.

7. The method of claim 6, wherein the display comprises:
a hand position detector that detects a moving direction and position of a hand based on previously stored coordinate information;
a first image mover that rotates and outputs an input image to a preset angle;
a second image mover that rotates and outputs an image that is output from the first image mover;
a rotator that is connected to the first image mover and the second image mover, and that linearly moves the second image mover in a lateral direction based on an input control signal or that rotates the first image mover by a preset angle and that laterally rotates the second image mover by a preset angle;
a controller that generates a control signal and transfers the control signal to the rotator to laterally move the second image mover based on a moving direction and position of a hand that is detected by the hand position detector; and
a display screen that displays at least one image which is output from the second image mover,
wherein the controller is configured to generate a control signal to sequentially transfer two images to different parts of the display screen by controlling the second image mover to rotate by a preset angle with a speed, thereby the two images being simultaneously displayed on the different parts of the display screen.

* * * * *